United States Patent [19]

Husmann

[11] Patent Number: 4,570,762
[45] Date of Patent: Feb. 18, 1986

[54] CAGE FOR A ROLLER BRAKE FREEWHEEL

[75] Inventor: Horst Husmann, Gifhorn, Fed. Rep. of Germany

[73] Assignee: Volkswagenwerk Aktiengesellschaft, Wolfsburg, Fed. Rep. of Germany

[21] Appl. No.: 649,557

[22] Filed: Sep. 11, 1984

[30] Foreign Application Priority Data

Sep. 14, 1983 [DE] Fed. Rep. of Germany ....... 3333130

[51] Int. Cl.$^4$ .............................................. F16D 15/00
[52] U.S. Cl. .................................... 188/82.84; 192/45
[58] Field of Search .................. 188/82.6, 82.77, 82.8, 188/82.84; 192/45

[56] References Cited

U.S. PATENT DOCUMENTS 3,917,036  11/1967  Johnson et al. ........................ 192/45

FOREIGN PATENT DOCUMENTS 1144065  2/1963  Fed. Rep. of Germany .
1264167  3/1968  Fed. Rep. of Germany .
2333237  1/1974  Fed. Rep. of Germany .
2403071  7/1975  Fed. Rep. of Germany .
2164097  9/1976  Fed. Rep. of Germany .
2719685  11/1978  Fed. Rep. of Germany .
2523385  4/1980  Fed. Rep. of Germany .
3023687  1/1982  Fed. Rep. of Germany .

*Primary Examiner*—Duane A. Reger
*Attorney, Agent, or Firm*—Brumbaugh, Graves, Donohue & Raymond

[57]  ABSTRACT

In the particular embodiments disclosed in the specification, a cage for a roller brake freewheel consists of two annular sidewall members which are connected with each other by connecting webs extending transversely between them so as to form chambers distributed over the circumference of the cage to accommodate corresponding brake rollers and springs. The annular side wall members are made in one piece and include resilient segments which facilitate elastic yielding. The resilient segments are in the form of connecting elements and the number of resilient segments is the same as the number of chambers.

14 Claims, 3 Drawing Figures

CAGE FOR A ROLLER BRAKE FREEWHEEL

BACKGROUND OF THE INVENTION

The invention relates to cages for roller brake freewheels and, more particularly, to a new and improved cage for roller brake freewheels especially adapted to accommodate variations in dimensions of the components.

Roller brake freewheels installed in hydrodynamic-mechanical automobile transmissions which at times also act as bearings generally consist of a plurality of individual components and are subjected to considerable stress during operation. Such stresses include stresses caused by different thermal expansion of the components, especially if the material of the cage is different from that of the surrounding structural elements, in particular, the outer and inner rings of the freewheel.

Therefore, it is an object of the present invention to provide a cage for a roller brake freewheel which permits compensation for such heat expansion differences without any difficulties and, moreover, can be produced in a simpler and less expensive manner.

SUMMARY OF THE INVENTION

In accordance with the invention a cage for a roller brake freewheel is provided with a pair of annular side wall members connected to each other and each having means permitting resilient yielding of the walls in the circumferential direction of the cage. Preferably the side wall members are of unitary construction and the resilient yielding means are a plurality of wall segments suitably distributed uniformly about the circumference of each side wall, the number of such segments preferably corresponding to the number of the rollers held in the cage. With this arrangement, differences in expansion of components which may occur at operating temperatures can safely be accommodated. The resilient yielding means may consist of connecting side wall segments of arcuate shape having tapered cross section which are located between side wall portions having a full cross sectional area.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
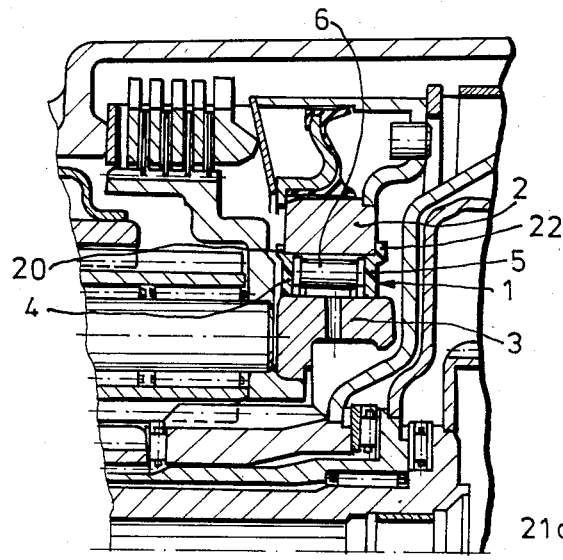
FIG. 1 is a fragmentary sectional view of a planetary gear of a hydrodynamic-mechanical automobile transmission having a roller brake freewheel provided with a representative cage made in accordance with the invention.

In the representative embodiment shown in the drawings, a roller brake freewheel in an automatic transmission for an automobile has an outer ring 2 supported in the transmission housing and an inner ring 3 carried by another component as shown in FIG. 1. The cage of the roller brake freewheel has two side wall members 4 and 5 in the form of annular plates which are joined by transversely extending webs 6. The view shown in FIG. 1 does not illustrate the springs and brake rollers of the roller brake freewheel.

The cage of the roller brake is held in laterally fixed position in the outer ring 2 by holding plates 20 and 22 projecting radially from the sidewall members 4 and 5, respectively, which engage the sides of the outer ring 2. In the illustrated embodiment the cage is also secured against rotation with respect to the stationary outer ring 2. For this purpose ramp-like projections 20a and 21a are formed on the outer periphery of the side wall members 4 and 5 to engage corresponding recesses, not shown in the drawings, on the inner periphery of the outer ring.

The inner ring 3 has a cylindrical outer surface and rotates with respect to the cage. To maintain the cage in fixed radial position with respect to the outer surface of the ring, the side wall members 4 and 5 are formed with corresponding inwardly extending wing-shaped elements 18 and 19 having supporting surfaces which slide on the outer surface of the inner ring and thereby perform a bearing function.

Figure 3:
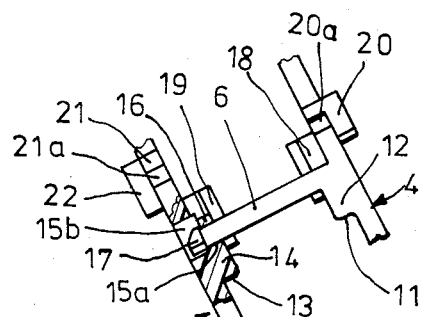
FIG. 3 is a fragmentary plan view of a portion of the cage of FIG. 2, without rollers and springs, showing the arrangement of a typical web joining the side wall members of the cage.
Figure 2:
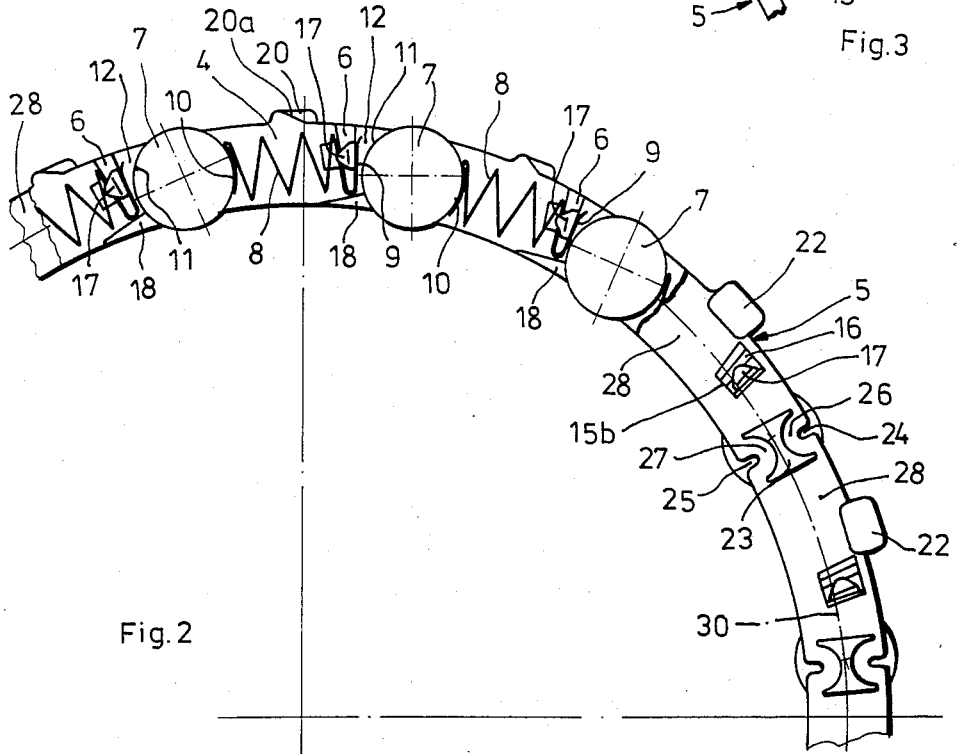
FIG. 2 is a fragmentary side view, partly broken away, illustrating a portion of a typical cage in accordance with the invention and showing the springs and rollers of the freewheel arranged therein.

The cage for the freewheel is shown on a larger scale in FIGS. 2 and 3, which also illustrate a series of brake rollers 7 disposed within the cage and springs 8 urging the rollers in one direction. In the illustrated embodiment the cage consists essentially of only two elements which are made of plastic and produced by injection molding. These elements are the side wall members 4 and 5, the connecting webs 6 being molded integrally with the wall member 4. With somewhat greater molding and machine effort, it would be possible to produce the entire cage, comprising the two side wall members and the connecting webs, in a single injection molding process.

In the embodiment shown in the drawings, the joining of the two side walls is accomplished by means of a clip or latch connection. For this purpose securing heads 17, fixed on the free end faces of the transverse webs 6, are pressed through openings 15a formed in the side wall 5 into corresponding recesses 15b so that they are engaged behind a web portion 16 of the side wall 5. The assembly of the wall members 4 and 5 and the connecting webs 6, which obviously may be made of a material other than plastic, could be accomplished in a different manner, such as by cementing or welding.

As best seen in FIG. 2, the springs 8 each have one end 9 embracing a transverse web 6 and the other end 10 formed into a cylindrical shape so as to conform to the peripheral surface of the adjacent brake roller 7. The springs press the brake rollers 7 into cylindrically shaped recesses 11 and 13 formed in reinforced material portions 12 and 14 of the side wall members 4 and 5 in the region of the transverse webs 6. With this arrangement, the springs and rollers may conveniently be mounted on the side wall member 4 having the transverse webs 6 before the ends of the webs are latched in the recesses of the side wall member 5.

FIGS. 2 and 3 show in greater detail the arrangement and shape of the radially projecting holding plates 20 provided on the side walls 4 and 5. Likewise, the shape of the ramp-like projection 20a, provided on the outer periphery of the side wall 4 for holding the cage in the circumferential direction, is apparent from FIG. 2. A similarly shaped ramp-like projection 21 is provided on the periphery of the side wall 5.

The wing-shaped support surfaces 18 and 19 projecting inwardly from the side walls 4 and 5 towards the center of the cage have the effect of bearing surfaces and are located in the region of the transverse webs 6. The wing-like shape of the bearing surfaces 18 and 19, which are substantially identical, is illustrated for the bearing surface 18 in the cut-away portion of the cage in FIG. 2. These surfaces slide on the cylindrical surface of the freewheel inner ring 3 and, together with the inner-periphery surfaces of the side walls 4 and 5, which also slide on the periphery of the freewheel inner ring 3, transmit the bearing forces by way of the side walls to the freewheel outer ring 2.

In order to enable the side walls 4 and 5, which are preferably composed of plastic and made in one piece, to accommodate any thermal expansions, which may occur during operation because of differences in materials, by elastic yielding in the direction of the circumference, arc-shaped connecting elements 26 and 27 having tapering cross sections are provided about the periphery of the side walls 4 and 5. The connecting elements are uniformly distributed around the periphery and, in the illustrated example, the number of side wall segments containing connecting elements is the same as the number of brake rollers 7 and springs 8 so that each individual chamber which is bounded by complete side wall segments 28 and contains a roller and a spring can adjust itself elastically relative to the adjacent chambers. The arc-shaped connecting elements 26 and 27, which connect the intervening segments, are arranged in the illustrated embodiment on the inner and outer circumferences of the side wall members 4 and 5, symmetrically relative to the circumferential center line 30 of the side walls.

The connecting elements are formed so that each side wall segment containing connecting elements has short recesses 24 and 25 with rounded edges on the outer and inner periphery of the sidewall, respectively, while the center region of the segment has an H-shaped opening 23. The H-shaped openings 23 are bounded at opposite sides of the circumference by the straight, substantially radial, ends of the adjacent sidewall portions 28 and in between by semicircular arcs. The arc-shaped connecting elements created in this manner facilitate elastic deformation and thereby permit displacement of the individual cage chambers enclosed by the side wall section 28 relative to one another in the direction of the circumference. Consequently, stresses which might occur in the side wall due to differences in expansion are substantially reduced. The illustrated construction makes it possible to produce the side wall members 4 and 5 in one piece, for example, of plastic, and then join them by means of a latch connection, providing a simplification of the production and assembly of the cage.

I claim:

1. A cage for a roller brake freewheel comprising two annular members forming the side walls of the cage, a plurality of connecting webs extending transversely between the side walls to join them and to form a plurality of chambers distributed about the circumference of the cage to accommodate corresponding brake rollers and springs, and at least one resilient portion formed in each of the annular members to facilitate elastic yielding in the direction of the circumference of the cage.

2. A cage according to claim 1 wherein the annular members are formed with a plurality of resilient portions distributed uniformly over the circumference of the cage.

3. A cage according to claim 2 wherein the number of resilient portions distributed uniformly over the circumference of the cage corresponds to the number of chambers.

4. A cage according to claim 1 wherein the resilient portions consist of connecting elements having tapering cross sections extending between side wall sections which have a complete cross section and form the sides of the chambers.

5. A cage according to claim 4 wherein the connecting elements are formed in an arc shape.

6. A cage according to claim 5 wherein the arc-shaped connecting elements are arranged along the radially outer and the radially inner circumference of the annular members.

7. A cage according to claim 6 wherein the radially inner and radially outer arc-shaped connecting elements are arranged symmetrically with respect to the circumferential center line of the annular members.

8. A cage according to claim 1 including latch means for connecting the connecting webs with one of the annular members.

9. A cage according to claim 8 wherein the connecting webs are integral with one of the annular members and have retainer heads on their free ends adapted to be latched in corresponding apertures in the other annular member.

10. A cage according to claim 1 wherein the cage consists of two annular members and a plurality of connecting webs made in one piece.

11. A cage according to any of claims 1 to 10 wherein the annular members and the connecting webs are made of a synthetic material.

12. A cage according to any of claims 1 to 10 wherein the annular members have bearing surfaces formed on their radially inner periphery which are adapted to engage the inner ring of the freewheel.

13. A cage according to claim 12 wherein the bearing surfaces are distributed over the circumference and comprise wing shaped elements projecting from the annular members toward the center of the cage and having supporting surfaces.

14. A cage according to claim 13 wherein the supporting surfaces are positioned in the region of the connecting webs joining the annular members.

* * * * *